United States Patent Office 3,294,781
Patented Dec. 27, 1966

3,294,781
CARBOHYDRATE ALIPHATIC AND CYCLIC ACETALS
Mary Ollidene Weaver and Charles R. Russell, Peoria, Ill., assignors to the United States of America as represented by the Secretary of Agriculture
No Drawing. Filed June 11, 1963, Ser. No. 287,155
8 Claims. (Cl. 260—233.3)

A nonexclusive, irrevocable, royalty-free license in the invention herein described, throughout the world for all purposes of the United States Government, with the power to grant sublicenses for such purposes, is hereby granted to the Government of the United States of America.

This invention relates to novel products formed by the reaction of a carbohydrate and a vinyl ether.

More particularly this invention relates to a wide diversity of acetals obtained by reaction of a dimethyl sulfoxide dispersed carbohydrate such as starch, amylose, and glucose with a cyclic vinyl ether such as 3,4-dihydro-2H-pyran or with a short chain to long chain (fatty) saturated or unsaturated aliphatic vinyl ether, the selection of any particular vinyl ether reactant and the degree of substitution being largely controlled by the end use and the need for hydrophilic or for hydrophobic properties.

It is known to form the acetals of carbohydrates and of starches or similar polysaccharides by condensation with an aldehyde, e.g. formaldehyde or glyoxal. However, the configurationally promoted intermolecular crosslinks that result from the condensation of one aldehyde group with two alcoholic hydroxyl groups that are available in anhydroglucose units that are located in separate molecular chains of the polysaccharide produces water-insolubility. Although such water-insoluble prior art products add strength to paper when formed in situ on paper or paper pulps, applications of these crosslinked starches, etc. on to textile fibers to provide warp sizings have little or no industrial merit since their required removal after weaving but prior to the dyeing of the fabric with warm water is impossible and therefore requires chemical or enzymatic treatment. Chemical or enzymatic removals are also sometimes used for removing even water-soluble warp sizes. Also, despite their water-insolubility these aldehyde-crosslinked carbohydrate products do not waterproof materials to which they are applied.

It is well known in the textile art that whereas widely employed warp sizing agents such as starch and hydroxyethylated starch adhere quite well to cotton, the adherence of these warp sizes to such cellulose-derived fibers as the acetates and rayons and more particularly to the noncellulosic synthetic filaments such as the olefins, nylons, the acrilans, the polyesters, glass filaments, and to the copolymeric vinyls or vinylidenes including saran, nytril, the alvynes, the vinyons is relatively poor as evidenced by excessive flake-off during the high speed transits of the fibers during the weaving process.

It is, therefore, a principal object of this invention to produce novel acetals of a wide variety of carbohydrates including polysaccharides such as cellulose, flour, starch, amylose, amylopectin, dextrins, polysaccharide gums of plant origin, of microbial polysaccharides such as dextran, phosphomannans produced by members of the genus Hansenula, of Polysaccharide B–1459 produced by *Xanthomonas campestris* as well as the corresponding acetals of monomeric carbohydrates such as glucose and methyl glucoside.

Another object is the preparation of novel acetals wherein the acetal linkages do not comprise part of intermolecular crosslinkages.

Another object is the selective preparation of a variety of acetals in which hydrophilic or hydrophobic properties can be tailored simply by appropriate selection of the degree of substitution and choice of the vinyl ether, e.g., a cyclic vinyl ether, a lower aliphatic vinyl ether, or the vinyl ether of a $C_{10}$–$C_{18}$ saturated or unsaturated alcohol derived from a vegetable fatty acid. In connection with the acetal obtained by reacting starch with 3,4-dihydro-2H-pyran, it has been determined that the solubility is critically related to the degree of substitution, i.e., at a D.S. of 0.03–0.15 the product is soluble in water whereas at a D.S. of 0.2 or more it is water-insoluble. Solubility of the starch DHP acetals in dioxane, chloroform, and benzene appeared respectively at D.S.'s of 0.7, 1.1, and 1.5. Excepting for the reaction of DHP with granular starch in the absence of a solvent (which resulted in a maximum D.S. of 0.03) the D.S. is mainly a function of the molar ratio of the DHP to starch as shown in Table I and of the moisture content of the starch as shown in Table II.

TABLE I.—EFFECT OF MOLE RATIO OF STARCH TO DIHYDROPYRAN ON DEGREE OF SUBSTITUTION.

| Moles DHP/ mole (162 g.) starch | Yield [a] | D.S.[b] | Analysis, percent | |
|---|---|---|---|---|
| | | | C | H |
| 0 | ----- | 0 | 44.53 | 6.21 |
| 0.4 | 143.5 | 0.15 | 46.58 | 6.62 |
| 0.8 | 161.3 | 0.39 | 48.85 | 6.93 |
| 1.6 | 216.2 | 1.10 | 54.42 | 7.50 |
| 3.2 | 293.6 | 1.75 | 57.29 | 7.84 |
| 4.8 | 323.1 | 2.10 | 58.51 | 7.97 |
| 6.4 | 327.6 | 2.10 | 58.58 | 8.14 |
| [c] 11.6 | 332.0 | 2.50 | 59.46 | 8.06 |

[a] Expressed in grams per 162 g. of starch.
[b] D.S. calculated from carbon values.
[c] Procedure altered by doubling the amount of solvent and extending the 3 hr. reaction time (D.S. then 2.2) to 48 hours.

TABLE II.—EFFECT OF MOISTURE CONTENT OF STARCH REACTANT ON DEGREE OF SUBSTITUTION

| Moisture, percent | Moles DHP/ 162 g. starch | D.S. |
|---|---|---|
| 3.0 | 0.4 | 0.05 |
| 0.3 | 0.4 | 0.15 |
| 3.0 | 0.8 | 0.26 |
| 0.3 | 0.8 | 0.39 |
| 3.0 | 1.6 | 0.40 |
| 0.3 | 1.6 | 1.10 |

Our novel carbohydrate acetals are formed without the generation of water in accordance with the following general formula for the reaction of an aliphatic vinyl ether or a cyclic vinyl ether, i.e., 3,4-dihydro-2H-pyran, with a carbohydrate.

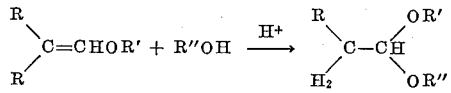

wherein R is selected from the group consisting of hydrogen and the 4-position residue of 3,4-dihydro-2H-pyran; R' is selected from the group consisting of a $C_2$–$C_{18}$ alkyl, a $C_{14}$–$C_{18}$ alkenyl corresponding to the vegetable oil derived alcohols, and the 2-position residue of 3,4-dihydro-2H-pyran; and R"OH is a carbohydrate selected from the group consisting of starch, amylose, and glucose, with the proviso that R is hydrogen only when R' is an alkyl or alkenyl, as defined above, and that R otherwise is the above said 4-position residue, in which latter instance R and R' together constitute the trimethylene radical to thusly form the pyran ring.

The following specific examples are merely illustrative of the large variety of novel and highly useful products that can be prepared in accordance with the broad teachings of our invention, and the indicated properties of

EXAMPLE 1

*DHP-starch acetal (D.S. 0.15).*—10 g. (0.062 mol.) of wheat starch previously oven-dried to a moisture content of less than 1 percent was gelatinized in 100 ml. of dimethyl sulfoxide (DMSO) by mechanically stirring on a steam bath for ½ hour. The dispersion was then cooled to 50° C. and maintained at that temperature throughout the following reaction. To the dispersion was added 0.25 ml. of catalyst (25% solution of HCl in dioxane). Then 2.2 ml. (0.024 mole) of 3,4-dihydro-2H-pyran was added in dropwise manner during the course of about 15 minutes. After 3 hours of stirring the clear, viscous reaction mixture was precipitated by pouring into an excess of absolute ethanol, then stirred, and isolated by filtration. The gummy mass which formed on drying was dissolved in a small amount of water, and reprecipitated by pouring into excess 95 percent ethanol. After drying and milling to a powder the starch acetal product weighed 9 g. Analysis showed C=46.65%; H=6.60%. Theory for D.S. 0.15: C=46.52%; H=6.62%.

Inasmuch as the above product was readily soluble in cold water and could be readily removed from warp fibers sized therewith, it was tested for this utility, especially since it is well known that the adhesion of the prior art starches to filaments of acetate rayon, nylon, vinyon, and other synthetic fibers is insufficient to prevent extensive flaking off during the weaving process unless polyvinyl alcohol or an acrylic resin has first been added to the prior art starch size. The data of Table III shows the resistance to flake-off from nylon of our starch-DHP acetal (D.S. 0.15) as compared with that of a commerically employed hydroxyethylated starch and a 1:1 mixture of the two. The tests were conducted by immersing squares of weighed nylon fabric in a 12.5 percent aqueous paste of the sizing agent at room temperature, removing excess size by passage through squeeze rolls, drying, re-weighing the squares, and placing each in a separate flask containing 10 marbles which contents were then mechanically tumbled for 1 hour before again weighing the sized samples. Sample C shows that the addition of our acetal to the commercial sizing agent markedly reduces the tendency of the latter to flake off. Comparisons with aldehyde-crosslinked starches were not feasible because of their water-insolubility.

Table IV shows additional data for both cotton and nylon sized with the starch-DHP acetal of this example.

TABLE III.—FLAKE-OFF FROM NYLON FABRIC

|  | A | B | C |
|---|---|---|---|
| Weight of nylon fabric | 0.4059 | 14.91 | 0.4659 |
| Weight of sized fabric | 0.5356 | 17.94 | 0.5786 |
| Size added | 0.1297 (31.9%) | 3.03 (20.3%) | 0.1127 (24.2%) |
| Weight after flexing | 0.5283 | 17.94 | 0.5775 |
| Size lost | 0.0073 (5.6%) | None | 0.0011 (1%) |

A = Commercial hydroxyethylated starch (2.5 g. in 20 ml. water).
B = Starch-DHP acetal (2.5 g. in 20 ml. water).
C = Mixture of 5 ml. of each of the above solutions.

TABLE IV

|  | Cotton | | Nylon | |
|---|---|---|---|---|
|  | Unsized | Sized | Unsized | Sized |
| Moisture, percent | 6.03 | 7.28 | 2.94 | 3.13 |
| Regain, percent | 4.87 | 4.62 | 3.37 | 5.00 |
| Boil-off, percent | 1.00 | 7.44 | 3.27 | 12.54 |
| Size add-on, percent |  | 6.44 |  | 9.27 |
| Single end break, gm | 547 | 592 | 144 | 147 |
| Increase, percent |  | 8.23 |  | 2.08 |
| Elongation, cm | 1.2 | 0.98 | 8.1 | 8.3 |
| Elongation change, percent |  | [1] 18.3 |  | [2] 2.47 |

[1] Decrease.  [2] Increase.

EXAMPLE 2

*DHP-starch acetal (D.S. 1.75).*—This product was prepared in a manner identical to that of Example 1 excepting that 18 ml. (0.20 mole) of the DHP was added to the gelatinized starch, and 300–400 ml. water was used as the precipitating agent instead of ethanol, clumps being broken up by stirring in a blendor. After isolation on a fritted funnel, the white solid was washed with three 200 ml. portions of water, spread in a thin layer to dry overnight, and then dried further for 1 hour in a forced air oven at 100° C. The yield was 18.2 g. Following grinding of the starch acetal to 40 mesh particles in a Wiley mill a sample was vacuum dried at 100° C. for 2 hours and analyzed for carbon and hydrogen. Found: C=57.15%; H=7.86%. Theory for D.S. 1.75: C=57.27%; H=7.82%.

This product was soluble in dioxane and benzene and difficulty soluble in dimethyl sulfoxide. It was insoluble in water and in ethanol. Ten grams of this product formed a very viscous solution in 100 ml. benzene, 9.5 g. of dry material being recovered by precipitation with petroleum ether. Re-analysis of this material showed C=57.43%; H=7.82%.

Organic solvent solutions of this acetal have utility as waterproof coatings for paper, paperboard, and similar products. Solutions in dioxane applied to paper and paperboard by dip, spray, or brush imparted a smooth, glossy, colorless finish.

Table V shows the disappearance times of drops of water applied to paper and plywood treated with the starch acetal of Example 2 in comparison to the disappearance of drops of water from a simple glass plate. Allowing for the difference in drop geometry on the two surfaces, the disappearances from the surfaces treated with the 5 percent solution were identical with that from glass, showing that the disappearance is the result of evaporation and not of absorption.

TABLE V

| Surface | Concentration of solution applied | | |
|---|---|---|---|
|  | 0% | 2.5% | 5% |
| Paper | 3'47" | 43'15" | 52'37" |
| Plywood* | 3'15" | 46'10" | 55'18" |
| Glass plate | 55' |  |  |

*3 coats were applied.

EXAMPLE 3

*Starch-DHP acetal (D.S. 2.60).*—5 g. (0.03 mole) of starch predried to a moisture content below 1 percent was gelatinized with 125 ml. dimethylsulfoxide as in Example 1. The reaction flask was then placed in a constant temperature bath (45–48° C.), and 0.25 ml. of the HCl-dioxane catalyst solution was added. Then 32 ml. (0.35 mole) of the DHP was added dropwise, and with continuous stirring the reaction was continued for 48 hours. The product was precipitated by pouring into water and then worked up as in Example 1. A white powder was obtained in a yield of 10.1 g. After dissolving in benzene and reprecipitating with petroleum ether, the analysis was: C=59.84; H=8.02. Theory for D.S. 2.60: C=59.83; H=8.02. [$\eta$] in benzene =0.49. The acetal was soluble in dioxane, chloroform, and benzene. It showed water-proofing characteristics comparable to those shown by the product of Example 2.

EXAMPLE 4

*Starch-ethyl vinyl ether acetal (D.S. 0.02–0.05).*—10 g. (0.062 mole portions) of previously dried starch were gelatinized by heating and stirring for 30 minutes in 100 ml. DMSO, the dispersion cooled to room temperature, 0.25 ml. of HCl-dioxane catalyst added, and respectively 3.0 and 6.0 ml. of ethyl vinyl ether (0.5 and 1.0 mole/ starch AGU) were then added to respective flasks in a dropwise manner over 5–15 minutes. After 1 hour of reaction, the clear reaction mixtures were precipitated by pouring into acetone, and recovered by filtration. After washing and drying in air the products respectively analyzed 1.27 percent and 2.2 percent $OC_2H_5$. The products showed initial water solubility that decreased with time, apparently as result of some delayed crosslinking. This characteristic would permit application of the acetal in aqueous solution which on evaporation leaves a water-resistant coating or adhesive.

EXAMPLE 5

*Starch-ethyl vinyl ether acetal (D.S. 2.03 and 2.4).*—Same as Example 4 except for molar ratios of ethyl vinyl ether to starch and that water was substituted for acetone as the precipitating agent. D.S. 2.03: 4 moles of ethyl vinyl ether employed per 162 g. of starch.

*Analysis.*—$C=54.92\%$; $H=8.77\%$;

$$-OC_2H_5 = 30.62\%$$

Theory for D.S. 2.03: $C=55.00\%$; $H=8.52\%$;

$$-OC_2H_5 = 29.67\%$$

$[\eta]$ in dioxane 0.607. D.S. 2.4: 8 m. EVE/162 g. (1 mole) of starch.
*Analysis.*—$C=55.96\%$; $H=8.71\%$;

$$-OC_2H_5 = 31.60\%$$

Theory for D.S. 2.4: $C=55.94\%$; $H=8.72\%$;

$$-OC_2H_5 = 32.28\%$$

$[\eta]$ in dioxane 0.705.

Test results when test paper was coated with product of D.S. 2.03:

| Percent wt. gain | Burst (No.) | Drop (sec.) |
|---|---|---|
| 0 | 14.75 | 204 |
| 1.03 | 18.0 | >600 |
| 8.97 | 19.5 | >600 |
| 12.38 | 23.0 | >600 |

Breaking lengths of coated paper:

| Percent wt. gain | Break length in meters | |
|---|---|---|
| | Dry | After 2 min. water soak |
| 0 | 4,220 | 380 |
| 2.11 | 4,790 | 550 |
| 18.50 | 6,300 | 1,100 |

EXAMPLE 6

*Starch-stearyl vinyl ether acetal (D.S. 1.5).*—A reaction mixture consisting of 2 g. (0.012 mole) of previously dried starch, 10 ml. (.03 mole) stearyl vinyl ether, 20 ml. benzene, 25 ml. dimethylsulfoxide, and 1 drop of 20 percent aqueous HCl was stirred and heated under reflux for 4 hours. After cooling, the reaction mixture was adjusted to pH 7.2 with sodium methylate solution and poured into water. The resulting precipitate was obtained by filtration. After washing with water and drying in a vacuum desiccator, 8.4 g. of product was obtained. It analyzed 72.58% C and 12.24% H. It was insoluble in boiling water and swelled markedly in each of benzene, chloroform, dioxane, and dimethyl sulfoxide. It had a wax-like appearance and feel and a melting point of 300° C., suggesting its employment as a high melting wax.

EXAMPLE 7

*Starch-conjugated soybean oil vinyl ether acetal (D.S. 1.5).*—This acetal was prepared in the same manner as was the DHP acetal of Example 3 excepting that 50 ml. of conjugated soybean oil vinyl ether was substituted for the dihydropyran and the reaction temperature was held at 25° C. After filtering the product from the water in which it had been precipitated, it was dissolved in benzene, which was then removed in vacuo. Analysis: $C=72.81\%$; $H=11.30\%$. After standing for 14 days the solid was insoluble in benzene as well as in water, indicating that it cures in air and has potential utility as a protective coating or varnish.

EXAMPLE 8

*Glucose-stearyl vinyl ether acetal (D.S.>2).*—A mixture consisting of 1.8 g. (.01 mole) anhydrous glucose, 18 g. (0.06 mole) stearyl vinyl ether, 20 ml. DMSO, and 0.25 ml. of 25 percent HCl in dioxane was heated with stirring for 2 hours on a steam bath, and the product was then precipitated by pouring into water, from which 17 g. of dry product was recovered. The latter was soluble in ethyl acetate, dioxane, benzene, and chloroform, but not in water. After reprecipitation and passage over a cellulose column the purified product analyzed: $C=76.06\%$; $H=13.19\%$. It had a waxy appearance and feel, and its M.P. of 40° C. suggests utility as a low melting wax.

EXAMPLE 9

*Amylose-ethyl vinyl ether acetal (D.S. 2.04).*—This was prepared in the same manner as the acetal of Example 4 excepting that amylose was substituted for the starch and the molar ratio of the ethyl vinyl ether per mole of AGU's was 8. Self-supporting films were cast from organic solvent solutions of the product. The films heat-seal and are markedly water-resistant. A container formed from the film was filled with water and allowed to stand for several weeks. It then showed no evidence of water penetration or deterioration of the film.

EXAMPLE 10

*Starch-decyl vinyl ether acetal (D.S. 1.5).*—Ten grams (0.06 mol.) of dry starch was gelatinized in 100 ml. of DMSO in usual fashion as in the preceding examples and 5 drops 36% aqueous HCl was added. To the hot mixture 50 g. (0.27 mole) of decyl vinyl ether was added in a dropwise fashion. After continued stirring and heating for 1 hour the mixture was poured into water. The product was isolated by filtration, washed thoroughly with water, and then washed once with ethanol. The solid was then extracted continuously for 24 hours with hot benzene in a Soxhlet extractor, then washed again with ethanol and dried first in a forced-air oven for 1 hour and then under vacuum at 90 degrees for 3 hours. It was blended with water, dried again, and then weighed 23 g. *Analysis.*—$C=65.98\%$; $H=10.26\%$. Theory for D.S. 1.5; $C=66.00\%$; $H=10.19\%$. The product is a gummy insoluble material which swells copiously in benzene, dioxane, chloroform and other organic solvents.

We claim:
1. Carbohydrate acetal products having a D.S. of 0.03–2.50 and having the following structure

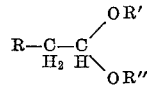

wherein R is selected from the group consisting of hydrogen and the 4-position residue of 3,4-dihydro-2H-pyran; R' is selected from the group consisting of a $C_2$–$C_{18}$ alkyl, a $C_{14}$–$C_{18}$ alkenyl corresponding to the vegetable oil-derived fatty alcohols, and the 2-position residue of 3,4-dihydro-2H-pyran; and R" is a carbohydrate selected from the group consisting of starch, amylose, and glucose, with the proviso that R is hydrogen only when R' is a member of the group consisting of alkyl and alkenyl, as above defined, R otherwise being the said 4-position residue of 3,4-dihydro-2H-pyran in which latter instance R and R' together constitute the trimethylene radical from the said 3,4-dihydro-2H-pyran.

2. Product according to claim 1 wherein R is the 4-position residue of 3,4-dihydro-2H-pyran, R' is the 2-position residue of 3,4-dihydro-2H-pyran, and R" is starch, said product having an acetal D.S. of 0.15.

3. Product according to claim 2 wherein the acetal D.S. value is 1.75.

4. Product according to claim 1 wherein R is hydrogen, R' is the ethyl radical, R" is starch, and the acetal D.S. value is 0.05.

5. Product according to claim 1 wherein R is hydrogen, R' is the stearyl radical, R" is starch, and the acetal D.S. value is 1.5.

6. Product according to claim 1 wherein R is hydrogen, R' is a polyunsaturated $C_{18}$ radical derived from soybean alcohol, R" is starch, and the acetal D.S. value is 1.5.

7. Method of preparing the carbohydrate acetals of claim 1 comprising reacting a dimethylsulfoxide dispersion of a hereinafter defined dried carbohydrate containing not over 3 percent moisture with about 0.4 to about 12 mole equivalents based on the carbohydrate of a vinyl ether selected from the group consisting of 3,4-dihydro-2H-pyran, the vinyl ethers of the $C_2$–$C_{18}$ saturated aliphatic alcohols, and the vinyl ethers of the $C_{14}$–$C_{18}$ unsaturated aliphatic alcohols derived from the vegetable oil conjugated fatty acids, the carbohydrate being selected from the group consisting of starch, amylose, and glucose, the dispersion also comprising a catalytic amount of HCl dissolved in dioxane, and isolating the carbohydrate acetal from the reaction mixture.

8. As in article of manufacture, a yarn selected from the group consisting of those of cotton and nylon yarns sized with the 3,4-dihydro-2H-pyran acetal of starch having a D.S. of 0.15.

References Cited by the Examiner
UNITED STATES PATENTS

| | | | |
|---|---|---|---|
| 2,539,704 | 1/1951 | Schoene et al. | 260—231 |
| 2,682,532 | 6/1954 | Adelman | 260—91.1 |

LEON J. BERCOVITZ, *Primary Examiner.*

R. W. MULCAHY, *Assistant Examiner.*